US012563213B2

(12) United States Patent
Henry et al.

(10) Patent No.: US 12,563,213 B2
(45) Date of Patent: Feb. 24, 2026

(54) PARALLELIZED VIDEO DECODING USING A NEURAL NETWORK

(71) Applicant: ORANGE, Issy-les-Moulineaux (FR)

(72) Inventors: Félix Henry, Saint Gregoire (FR); Gordon Clare, Pacé (FR)

(73) Assignee: ORANGE, Issy-les-Moulineaux (FR)

( * ) Notice: Subject to any disclaimer, the term of this patent is extended or adjusted under 35 U.S.C. 154(b) by 247 days.

(21) Appl. No.: 18/016,568

(22) PCT Filed: Jul. 13, 2021

(86) PCT No.: PCT/EP2021/069515
§ 371 (c)(1),
(2) Date: Jan. 17, 2023

(87) PCT Pub. No.: WO2022/013247
PCT Pub. Date: Jan. 20, 2022

(65) Prior Publication Data
US 2023/0283790 A1 Sep. 7, 2023

(30) Foreign Application Priority Data
Jul. 17, 2020 (FR) ...................................... 2007530

(51) Int. Cl.
*H04N 19/436* (2014.01)
*H04N 19/90* (2014.01)

(52) U.S. Cl.
CPC ........... *H04N 19/436* (2014.11); *H04N 19/90* (2014.11)

(58) Field of Classification Search
CPC .................................................. H04N 19/436
(Continued)

(56) References Cited

U.S. PATENT DOCUMENTS 5,734,589 A * 3/1998 Kostreski ......... H04N 21/23617
348/E7.071
2018/0249158 A1* 8/2018 Huang ................... H04N 19/82
(Continued)

FOREIGN PATENT DOCUMENTS

| WO | 2017/036370 | 3/2017 |
| WO | 2019131880 A1 | 7/2019 |
| WO | 2019191205 A1 | 10/2019 |

OTHER PUBLICATIONS

International Search Report dated Sep. 30, 2021, for PCT/EP2021/069515, 6 pp.
(Continued)

*Primary Examiner* — Yulin Sun
(74) *Attorney, Agent, or Firm* — David D. Brush; Westman, Champlin & Koehler, P.A.

(57) ABSTRACT

In a method for decoding a data stream by way of an electronic device (10) including a processor (14), and a parallelized processing unit (16) designed to perform a plurality of operations of the same type in parallel at a given time, the data stream includes a first dataset (Fet) and a second dataset (Fnn) representative of audio or video content. The decoding method includes the processor (14) processing data from the first dataset (Fet), obtaining the audio or video content by processing (E70) data from the second dataset (Fnn) using a process depending at least partially on the data from the first set (Fet) and using an artificial neural network (18) implemented by the parallelized processing unit (16).

19 Claims, 3 Drawing Sheets

(58) Field of Classification Search
USPC .................................................... 375/240.12
See application file for complete search history.

(56) References Cited

U.S. PATENT DOCUMENTS

| | | | |
|---|---|---|---|
| 2018/0293758 A1 | 10/2018 | Bar-On et al. | |
| 2018/0307980 A1* | 10/2018 | Barik .................... | G06F 9/3887 |
| 2019/0075301 A1* | 3/2019 | Chou .................... | H04N 19/132 |
| 2020/0329258 A1 | 10/2020 | Wang et al. | |

OTHER PUBLICATIONS

Written Opinion of the ISA dated Sep. 30, 2021, for PCT/EP2021/069515, 6 pp.

Gary S. Sullivan et al., "Overview of the High Efficiency Video Coding (HEVC) Standard", IEEE Transactions on Circuits and Systems for Video Technology, vol. 22, No. 12, Dec. 2012, pp. 1649-1668.

International organization for Standardization, ISO/IEC JTC1/SC29/WG11, Coding of Moving Pictures and Audio, "Use cases and requirements for compressed representation of neural networks", Oct. 2018, an ISO/IEC document, 37 pp.

Joe Osborne, "Google's Tensor Processing Unit explained: this is what the future of computing looks like", published Aug. 22, 2016, retrieved at: https://www.techradar.com/news/computing-components/processors/google-s-tensorprocessing-unit-explained-this-is-what-the-future-of-computing-looks-like-1326915, on Dec. 21, 2022, 3 pp.

Simon Wiedemann et al., "Compact and Computationally Efficient Representation of Deep Neural Networks", IEEE Transactions of Neural Networks and Learning Systems, vol. 31, No. 3, Mar. 2020, pp. 772-785.

Simon Wiedemann et al., "DeepCABAC: Context-adaptive binary arithmetic coding for deep neural network compression", Proceedings of the 36th International Conference on Machine Learning, Long Beach, California, PMLR 97, 2019, 4 pp.

Guo Lu et al., "DVC: An End-to-end Deep Video Compression Framework", submitted Nov. 30, 2018, available at URL: https://arxiv.org/abs/1812.00101, 10 pp.

S. Carrato et al., "Parallel Structure Based on Neural Networks for Image Compression", Electronic Letters, vol. 28, No. 12, Jun. 4, 1992. Submission Pending.

S. Carrato et al., "Parallel Structure Based on Neural Networks for Image Compression", Electronic Letters, vol. 28, No. 12, Jun. 4, 1992, pp. 1152-1153.

Japanese Notice of Reasons for Rejection dated Jul. 1, 2025 for corresponding Japanese Application No. 2023-503012.

English translation of the Written Opinion of the International Searching Authority dated Sep. 30, 2021 for corresponding International Application No. PCT/EP2021/069515, filed Jul. 13, 2021.

Japanese Notice of Reasons for Rejection dated Nov. 18, 2025 for corresponding Japanese Application No. 2023-503012.

* cited by examiner

PARALLELIZED VIDEO DECODING USING A NEURAL NETWORK

CROSS-REFERENCE TO RELATED APPLICATIONS

This application is the U.S. national phase of International Application No. PCT/EP2021/069515 filed Jul. 13, 2021, which designated the U.S. and claims priority to FR 2007530 filed Jul. 17, 2020, the entire contents of each of which are hereby incorporated by reference.

TECHNICAL FIELD OF THE INVENTION

The present invention relates to the technical field of content decoding, in particular audio or video content.

In particularly, it relates to a method and an electronic device for decoding a data stream, as well as an associated data stream.

STATE OF THE ART

It is known, in particular in the field of video decoding, to use an electronic device comprising both a processor (generally a central unit of the electronic device, or CPU for "Central Processing Unit") and a parallelized processing unit designed to perform in parallel, at a given time, a plurality of operations of the same type. Such a parallelized processing unit is for example a Graphical Processing Unit or GPU, or a Tensor Processing Unit or TPU, as described for example in the article "*Google's Tensor Processing Unit explained: this is what the future of computing looks like*", by Joe Osborne, Techradar, Aug. 22, 2016.

It has moreover been proposed to compress data representative of a video content by means of an artificial neural network. The decoding of the compressed data can then be performed by means of another artificial neural network, as described for example in the article "*DVC: An End-to-end Deep Video Compression Framework*", by Guo Lu et al., 2019 IEEE/CVF Conference on Computer Vision and Pattern Recognition (CVPR), Long Beach, CA, USA, 2019, pp. 10998-11007.

DISCLOSURE OF THE INVENTION

In this context, the present invention proposes a method for decoding a data stream by means of an electronic device comprising a processor, and a parallelized processing unit designed to perform in parallel, at a given time, a plurality of operations of the same type, characterized in that the data stream comprises a first set of data and a second set of data representative of an audio or video content, and in that the method comprises the following steps:

processing the data from the first set of data by the processor;

obtaining the audio or video content by processing the data from the second set of data using a process depending on part at least of the data from the first set and using an artificial neural network implemented by the parallelized processing unit.

The processing of the data from the second set by means of the artificial neural network implemented by the parallelized processing unit can thus be adapted as a function of the data from the first set contained in the data stream. This provides a flexible and efficient processing of the second data for their decoding by an artificial neural network.

The method can hence comprise for example a step of configuring the parallelized processing unit as a function of part at least of the data from the first set of data.

The configuration of the parallelized processing unit may comprise an allocation of memory of the parallelized processing unit and/or an instantiation of the memory of the parallelized processing memory and/or an assignment of values (as a function of said part at least of the data from the first set of data) to the processing operations implemented on the parallelized processing unit (here, in practice, assignment of weights and/or activation functions defining the artificial neural network, these weights and/or activation functions being determined as a function of said part at least of the data from the first set of data).

According to a first possibility, the first set of data may comprise data descriptive of the artificial neural network (for example, data encoding the artificial neural network). In this case, at the configuration step, the processor may configure the parallelized processing unit on the basis of these descriptive data.

According to a second possibility, the electronic device may comprise a storage unit for storing a plurality of parameter sets defining respectively a plurality of artificial neural networks. The first set of data may, in this case, comprise an identifier. At the configuration step, the processor can then configure the parallelized processing unit on the basis of a set of parameters associated with this identifier among the plurality of parameter sets.

The processor is for example a microprocessor; the processor can thus execute successively a plurality of instructions from a computer program.

Moreover, it may be provided that the data stream further comprises instructions executable (for example by the processor or, as an alternative, by a virtual machine) within the electronic device. The processing of the data from the first set of data may in this case be at least in part performed due to the execution of part at least of these instructions.

In particular, the configuration step of the parallelized processing unit may then be performed due to the execution of part at least of these instructions.

The decoding method may moreover include a step of identifying the first set of data and the second set of data within the data stream (for example thanks to the use of a predetermined binary length for the first set of data and/or the second set of data, or thanks to the use of an indicator of boundary between the first set of data and the second set of data).

The first set of data may further comprise data representative of characteristics of the format of the content encoded by the data stream.

When the content is a video content (that is to say this content comprises at least one image, potentially a sequence of images), the processing of the data from the second set may produce for example at least one matrix representation of part at least of an image (for example a block of the image or a component of the image, or also the full image).

The artificial neural network may receive as an input (that is to say at an input layer of the artificial neural network) data from the second set of data. The artificial neural network may moreover produce as an output (that is to say at an output layer of the artificial neural network) the above-mentioned matrix representation.

According to a possible embodiment, the artificial neural network may further receive as an input (that is to say at the above-mentioned input layer) data previously produced as an output (that is to say at the output layer) of the artificial neural network.

The invention also proposes an electronic device for decoding a data stream comprising a first set of data and a second set of data representative of an audio or video content, the electronic device comprising:

a processor adapted to process the data from the first set of data;

a parallelized processing unit designed to perform in parallel, at a given time, a plurality of operations of the same type and adapted to obtain the audio or video content by processing the data from the second set of data using a process depending on part at least of the data from the first set and using an artificial neural network implemented by the parallelized processing unit.

As already indicated, the processor may further be adapted to configure the parallelized processing unit as a function of part at least of the data from the first set of data.

The parallelized processing unit can be adapted to produce at least one matrix representation of part at least of an image.

The invention finally proposes a data stream comprising a first set of data and a second set of data representative of an audio or video content, wherein the first set of data comprises data defining at least in part a process for processing the data from the second set of data using an artificial neural network.

As already indicated and explained hereinafter, these data defining at least in part the processing process may be an identifier of the artificial neural network (among a predetermined set of artificial neural networks) or data descriptive of (for example, data encoding) the artificial neural network.

Of course, the different features, alternatives and embodiments of the invention can be associated with each other according to various combinations, insofar as they are not mutually incompatible or exclusive.

DETAILED DESCRIPTION OF THE INVENTION

Moreover, various other features of the invention will be apparent from the appended description made with reference to the drawings that illustrate non-limiting embodiments of the invention, and wherein:

FIG. 1 shows an electronic encoding device used within the framework of the invention;

FIG. 2 a flowchart showing steps of an encoding method implemented within the electronic encoding device of FIG. 1;

FIG. 1 shows an electronic encoding device 2 using at least one artificial neural network 8.

Figure 3:
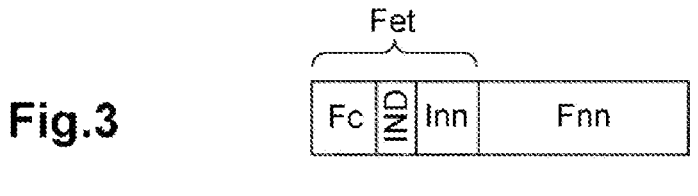
FIG. 3 is a first example of data stream obtained by the method of FIG. 2.

This electronic encoding device 2 comprises a processor 4 (for example, a microprocessor) and a parallelized processing unit 6, for example a Graphical Processing Unit or GPU, or a Tensor Processing Unit or TPU.

Figures 1, 2:
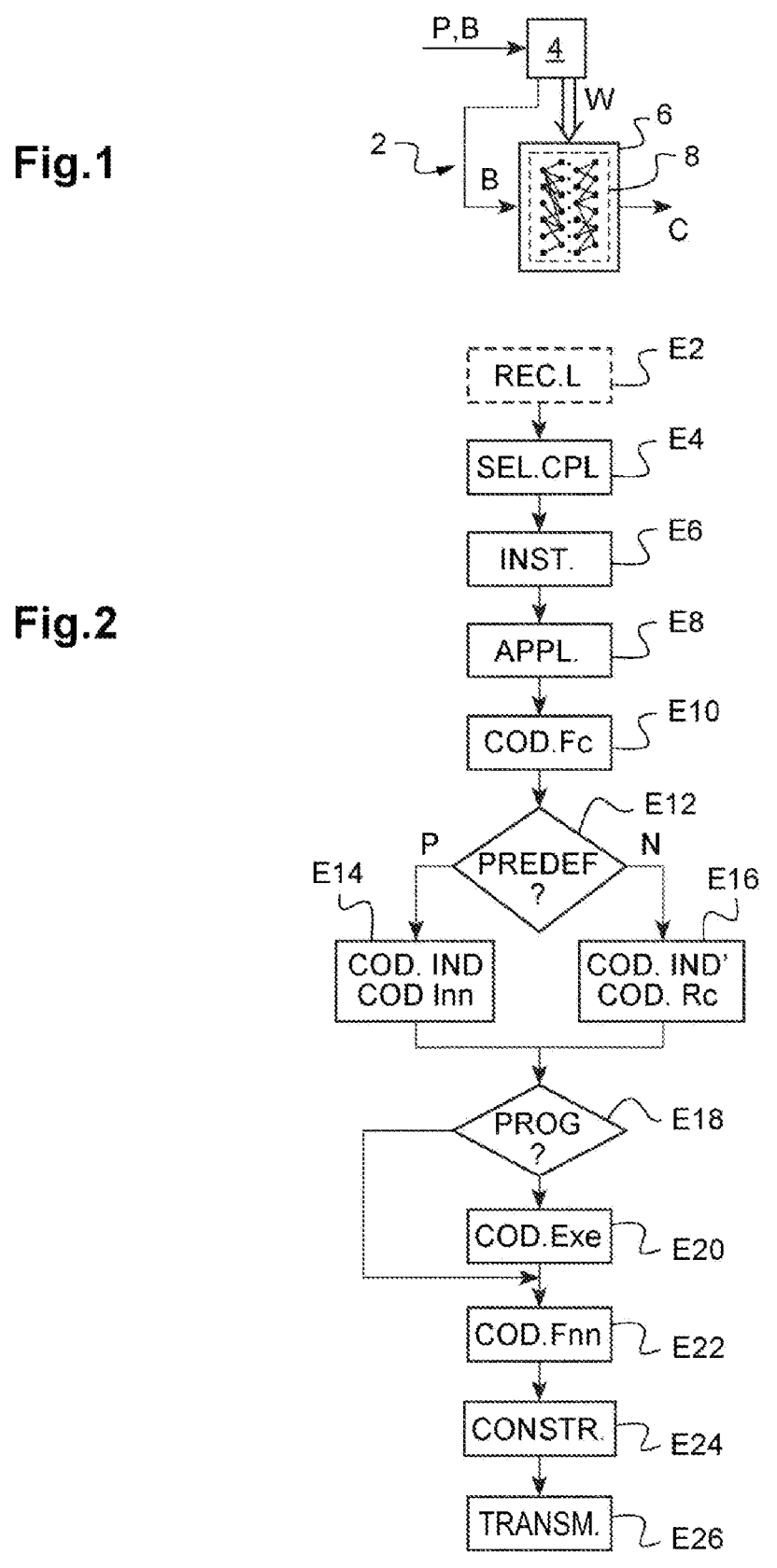

As schematically shown in FIG. 1, processor 4 receives data P, B representing an audio or video content to be compressed, here format data P and content data B.

Format data P indicate characteristics of the format of representation of the audio or video content, for example for a video content the image sizes (in pixels), the frame rate, the binary depth of the luminance information and the binary depth of the chrominance information.

Content data B form a representation (here not compressed) of the audio or video content. For example, in the case of a video content, the content data comprise, for each pixel of each image of a sequence of images, data representing a luminance value of the pixel and/or data representing chrominance values of the pixel.

Parallelized processing unit 6 is designed to implement an artificial neural network 8 after having been configured by processor 4. For that purpose, the parallelized processing unit is designed to perform in parallel, at a given time, a plurality of operations of the same type.

As explained hereinafter, artificial neural network 8 is used within the framework of a processing of content data B aiming at obtaining compressed data C.

In the embodiment described here, when the content data B are applied at the input of the artificial neural network 8, the artificial neural network 8 produces at the output the compressed data C.

Content data B applied at the input of the artificial neural network 8 (that is to say applied at an input layer of artificial neural network 8) may represent a block of an image, or a block of an image component (for example, a block of a luminance or chrominance component, or a block of a color component of this image), or an image of a video sequence, or a component of an image of a video sequence (for example, a luminance or chrominance component, or a color component), or also a series of images of the video sequence.

It may be provided for example in this case that some at least of the neurons of the input layer each receive a pixel value of an image component, said value being represented by one of the content data B.

As an alternative, the processing of content data B may include the use of several artificial neural networks, as described for example in the above-mentioned article "DVC: An End-to-end Deep Video Compression Framework", by Guo Lu et al., 2019 IEEE/CVF Conference on Computer Vision and Pattern Recognition (CVPR), June 2019.

An example of encoding method implemented by electronic encoding device 2 will now be described with reference to FIG. 2.

A memory linked to processor 4 stores for example computer program instructions designed to implement part at least of the steps of the method of FIG. 2 when these instructions are executed by processor 4. In other words, processor 4 is programmed to implement part at least of the steps of FIG. 2.

The method of FIG. 2 here starts by an optional step E2 of receiving a list of artificial neural networks accessible by an electronic decoding device.

The list is for example received by processor 4 of electronic encoding device 2 directly from an electronic decoding device (consistent for example with electronic decoding device 10 of FIG. 7 described hereinafter).

As explained hereinafter, the artificial neural networks accessible by the electronic decoding device are artificial neural networks for which the electronic decoding device stores parameters defining the concerned artificial neural network or may have access to these parameters by connection to remote electronic equipment such as a server.

As an alternative, the list could be received by processor 4 of electronic device 2 from a remote server, such as the above-mentioned server.

The method of FIG. 2 continues with a step E4 of selecting an encoding process-decoding process couple. As already indicated for the encoding process, the encoding process and the decoding process each use at least one artificial neural network.

In the example described here, the encoding process is implemented by an encoding artificial neural network and the decoding process is implemented by a decoding artificial neural network.

The set formed by the encoding artificial neural network and the decoding artificial neural network (the output of the encoding artificial neural network being applied to the input of the decoding artificial neural network) forms for example an autoencoder.

The encoding process-decoding process couple is for example selected among a plurality of predefined encoding process-decoding process couples, that is to say here among a plurality of encoding artificial neural network-decoding artificial neural network couples.

When a list of artificial neural networks accessible by an electronic decoding device is previously received (as explained hereinabove at step E2), the encoding process—decoding process couple is for example selected among encoding process—decoding process couples for which the decoding process uses an artificial neural network present in the received list.

The encoding process—decoding process couple may also be selected as a function of the intended application (indicated for example by a user using a user interface, not shown, of electronic encoding device 2). For example, if the intended application is videoconference, the encoding process—decoding process couple selected includes a low-latency decoding process. In other applications, the encoding process—decoding process couple selected will include a random-access decoding process.

In a low-latency process for decoding a video sequence, an image of the video sequence is for example represented by encoded data that may be sent and decoded immediately; the data may then be sent in the display order of the video images, which ensures in this case a latency of one frame between encoding and decoding.

In a random-access process for decoding a video sequence, the encoded data relating to a plurality of images, respectively, are sent in a different order than the display order of these images, which allows increasing the compression. Encoded images without reference to the other images (so-called intra frames) may then be encoded regularly, which allows starting the decoding of the video sequence from several locations in the encoded stream.

Reference may be made for that purpose to the article "*Overview of the High Efficiency Video Coding (HEVC) Standard*", by G. J. Sullivan, J.-R. Ohm, W.-J. Han and T. Wiegand, in IEEE Transactions on Circuits and Systems for Video Technology, vol. 22., no. 12, pp. 1649-1668 December 2012.

The encoding process—decoding process couple may also be selected in order to obtain the best possible compression—distortion compromise.

For that purpose, it is possible to apply a plurality of encoding process—decoding process couples to content data B and to select the set for which the better compression—distortion compromise is reached.

As an alternative, it is possible to determine the type of content (for example, by analyzing content data B) and to select the encoding process—decoding process couple as a function of the type determined.

The encoding process—decoding process couple can also be selected as a function of the computing power available at the electronic decoding device. Information representative of this computing power may have been previously transmitted from the electronic decoding device to the electronic encoding device (and received for example by the electronic encoding device at the above-mentioned step E2).

The different criteria for selecting the encoding process—decoding process couple may possibly be combined together.

Once the encoding process—decoding process couple selected, processor 4 proceeds, at step E6, to the configuration of parallelized processing unit 6 in such a way that parallelized processing unit 6 can implement the encoding method selected.

This step E6 comprises in particular the instantiation, within parallelized processing unit 6, of encoding artificial neural network 8 used by the encoded process selected.

This instantiation may comprise in particular the following steps:

reserving, within parallelized processing unit 6, the memory space required for implementing the encoding artificial neural network; and/or programming parallelized processing unit 6 with the weights W and activation functions defining encoding artificial neural network 8; and/or loading part at least of content data B in a local memory of parallelized processing unit 6.

The method of FIG. 2 then comprises a step E8 of implementing the encoding process, that is to say here applying content data B at the input of encoding artificial neural network 8 (or, in other word, activating encoding artificial neural network 8 by taking as an input content data B).

Step E8 thus allows producing compressed data C (here at the output of encoding artificial neural network 8).

The following steps relate to the encoding (that is to say the preparation) of the data stream containing in particular the compressed data C and intended to the electronic decoding device (for example, electronic decoding device 10 described with reference to FIG. 7).

The method thus comprises in particular a step E10 of encoding a first header part Fc that comprises data characteristic of the format of representation of the audio or video content (here, for example data linked to the format of the video sequence that is being encoded).

These data forming the first header part Fc indicate for example the image sizes (in pixels), the frame rate, the binary depth of the luminance information and the binary depth of the chrominance information. These data are for example built on the basis of the above-mentioned format data P (after a potential reformatting).

The method of FIG. 2 then continues with a step E12 of determining the availability of the decoding artificial neural networks (used by the decoding process selected at step E4) for the electronic decoding device capable of decoding the data stream (for example, electronic decoding device 10 described hereinafter with reference to FIG. 7).

This determination may be made on the basis of the list received at step E2: processor 4 determines in this case if the decoding artificial neural network used by the decoding process selected at step E4 belongs to the list received at step E2. (Naturally, in the embodiments in which the encoding process-decoding process couple is systematically chosen to correspond to a decoding artificial neural network available for the electronic decoding device, step E12 may be omitted and the method then continues with step E14.)

According to a possible embodiment, in the absence of information about the availability of the decoding artificial neural network for the electronic decoding device, the method continues with step E16 (in such a way that data descriptive of the decoding artificial neural network are transmitted to the electronic decoding device as explained hereinabove).

If processor 4 determines at step E12 that the decoding artificial neural network is available for the electronic decoding device (arrow P), the method continues with step E14 hereinafter.

If processor 4 determines at step E12 that the decoding artificial neural network is not available for the electronic decoding device (arrow N), the method continues with step E16 hereinafter.

As an alternative, the choice between step E14 and step E16 as a step after step E12 could be made depending on another criterion, for example as a function of a dedicated indicator stored within electronic encoding device 2 (and possibly adjustable by the user via a user interface of electronic encoding device 2) or as a function a choice made by the user (obtained for example via a user interface of electronic encoding device 2).

Processor 4 proceeds at step E14 to the encoding of a second header part comprising an indicator IND and a third header part here comprising an identifier Inn of the decoding artificial neural network.

Indicator IND encoded in the data stream at step E14 indicates that the decoding artificial neural network belongs to a predetermined set of artificial neural networks, here the set of artificial neural networks available (or accessible) for the electronic decoding device (that is to say, for example, the set of artificial neural networks of the list received at step E2).

Identifier Inn of the decoding artificial neural network is an identifier defining by convention (shared in particular by the electronic encoding device and the electronic decoding device) this decoding artificial neural network, for example within the above-mentioned predetermined set.

Processor 4 proceeds at step E16 to the encoding of a second header part comprising an indicator IND' and a third header part here comprising data Rc descriptive of the decoding artificial neural network.

Indicator IND' encoded in the data stream at step E16 indicates that the decoding artificial neural network is encoded in the data stream, that is to say represented by means of the above-mentioned descriptive data Rc.

The decoding artificial neural network is for example encoded (that is to say represented) by the descriptive data (or data encoding the decoding artificial neural network) Rc in accordance with a standard such as MPEG-7 part 17 or with a format such as JSON.

Reference may be made for that purpose to the article *"DeepCABAC: Context-adaptive binary arithmetic coding for deep neural network compression"*, by S. Wiedemann et al., in Proceedings of the 36th International Conference on Machine Learning, Long Beach, California, PMLR 97, 2019, or to the article *"Compact and Computationally Efficient Representation of Deep Neural Networks"*, by S. Wiedemann et al., in IEEE Transactions on Neural Networks and Learning Systems (Vol. 31, Iss. 3), March 2020.

After step E14, as after step E16, the method of FIG. 2 continues with a step E18 of determining the possibility for the electronic decoding device to implement the decoding process using the decoding artificial neural network.

Processor 4 determines for example this possibility by determining (potentially by means of previous exchanges between the electronic encoding device and the electronic decoding device) if the electronic decoding device comprises a module designed to implement this decoding process or a software suitable for implementation of this decoding process by the electronic decoding device when this software is executed by a processor of the electronic decoding device.

If processor 4 determines that it is possible for the electronic decoding device to implement the decoding process, the method continues with step E22 described hereinafter.

If processor 4 determines that it is not possible for the electronic decoding device to implement the decoding process, the method performs step E20 described hereinafter (before going to step E22).

As an alternative, the choice to perform or not step E20 (before performing step E22) could be made depending on another criterion, for example as a function of a dedicated indicator stored within electronic encoding device 2 (and possibly adjustable by the user via a user interface of electronic encoding device 2) or as a function a choice made by the user (obtained for example via a user interface of electronic encoding device 2).

Processor 4 encodes in the data stream, at step E20, a fourth header part containing a computer program Exe (or code) executable by a processor of the electronic decoding device. (The use of the computer program Exe within the electronic decoding device is described hereinafter with reference to FIG. 8.)

In order to be adapted to an execution within the electronic decoding device, the computer program is for example chosen within a library as a function of information relating to the hardware configuration of the electronic decoding device (information received for example during previous exchanges between electronic encoding device 2 and the electronic decoding device).

Processor 4 then proceeds to a step E22 of encoding a compressed stream Fnn on the basis of compressed data C obtained at step E8.

It is observed in this respect that, in the above description, step E8 has been described before the steps of encoding header Fet (steps E10 to E20). Step E8 could however in practice be carried out just before step E22.

In particular, when step E8 allows the processing of part only of the audio or video content to be compressed (for example, when step E8 performs the processing of a block, or a component, or an image of a video sequence to be compressed), it is possible to repeat the implementation of steps E8 (to obtain compressed data related to the successive parts of the content) and E22 (to encode in the data stream the compressed data obtained).

Processor 4 can thus construct at step E24 the complete data stream comprising header Fet and compressed stream Fnn.

The complete data stream is constructed in such a way that header Fet and compressed stream Fnn are identifiable individually.

According to a possible embodiment, header Fet contains an indicator of beginning of compressed stream Fnn in the complete data stream. This indicator is for example the location, in bits, of the beginning of compressed stream Fnn from the beginning of the complete data stream. (In other words, the header has in this case a predetermined fixed length.)

Other means for identifying header Fet and compressed stream Fnn can be contemplated as an alternative, as for example a marker (that is to say a binary combination used to indicate the beginning of compressed stream Fnn and the use of which is forbidden in the rest of the data stream, or at least in header Fet).

In FIGS. 3 to 6 are shown examples of complete data streams that may be obtained by the method of FIG. 2.

As explained hereinabove, these data streams comprise a header Fet and a compressed stream Fnn.

In the case of FIG. 3 (which corresponds to the situation in which step E14 has been implemented and step E20 has not been implemented), the header comprises:

a first part Fc comprising the data characteristic of the format of representation of the audio or video content;
  a second part comprising indicator IND indicating that the decoding artificial neural network belongs to a predetermined set of artificial neural networks; and
  a third part comprising identifier Inn of the decoding artificial neural network.

Figure 4:
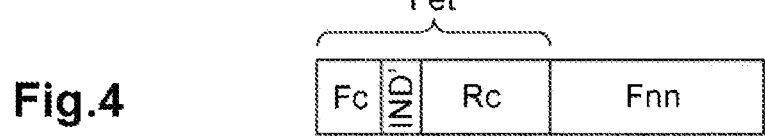
FIG. 4 is a second example of data stream obtained by the method of FIG. 2.

In the case of FIG. 4 (which corresponds to the situation in which step E16 has been implemented and step E20 has not been implemented), the header comprises:

a first part Fc comprising the data characteristic of the format of representation of the audio or video content;
  a second part comprising indicator IND' indicating that the decoding artificial neural network is encoded in the data stream; and
  a third part comprising data Rc descriptive of (here the data encoding) the decoding artificial neural network.

Figure 5:
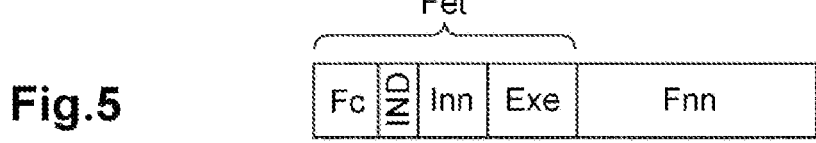
FIG. 5 is a third example of data stream obtained by the method of FIG. 2.

In the case of FIG. 5 (which corresponds to the situation in which steps E14 and E20 have been implemented), the header comprises:

a first part Fc comprising the data characteristic of the format of representation of the audio or video content;
  a second part comprising indicator IND indicating that the decoding artificial neural network belongs to a predetermined set of artificial neural networks;
  a third part comprising identifier Inn of the decoding artificial neural network; and
  a fourth part comprising computer program Exe.

Figure 6:
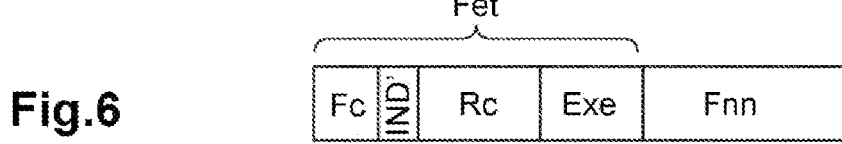
FIG. 6 is a fourth example of data stream obtained by the method of FIG. 2.

In the case of FIG. 6 (which corresponds to the situation in which steps E16 and E20 have been implemented), the header comprises:

a first part Fc comprising the data characteristic of the format of representation of the audio or video content;
  a second part comprising indicator IND indicating that the decoding artificial neural network is encoded in the data stream; and
  a third part comprising data Rc descriptive of (here the data encoding) the decoding artificial neural network; and
  a fourth part comprising computer program Exe.

The data stream constructed at step E24 may be encapsulated in transmission formats known per se, such as format "Packet-Transport System" or format "Byte-Stream".

In the case of format "Packet-Transport System" (as proposed for example by the RTP protocol), the data are encoded by identifiable packets and transmitted on a communication network. The network can easily identify the boundaries of the data (images, groups of images and here header Fet and compressed stream Fnn), using packet identification information provided by the network layer.

In format "Byte-Stream", there is no specifically packets and the construction of step E24 must allow identifying the boundaries of the relevant data (such as boundaries between parts of the stream corresponding to each image, and here between header Fet and compressed stream Fnn) using additional means, such as the use of network abstraction layer (NAL) units, where unique binary combinations (such as 0x00000001) make it possible to identify the boundaries between data).

The complete data stream constructed at step E24 can then be emitted at step E26 towards electronic decoding device 26 (by communication means not shown and/or through at least one communication network), or stored within the electronic encoding device 2 (for later transmission or, as an alternative, later decoding, for example within the electronic encoding device itself, which is in this case designed to further implement the decoding method described hereinafter with reference to FIG. 8).

When the audio or video content comprises a plurality of parts (for example a plurality of groups of images when the content is a video sequence), the method of steps E4 to E24 can possibly be implemented for each part of the content (for example, for each group of images) in such a way as to obtain a stream of data as shown in one of FIGS. 3 to 6 for each part of the content (for example, for each group of images). Therefore, compressed stream Fnn related to each group of images can be decoded using an artificial neural network proper to the concerned group of images and potentially different from the artificial neural networks used for the other groups of images, as described hereinafter. The artificial neural networks may possibly have identical structures (and be different only by their weights and/or the activation functions that define a particular artificial neural network).

Figure 7:
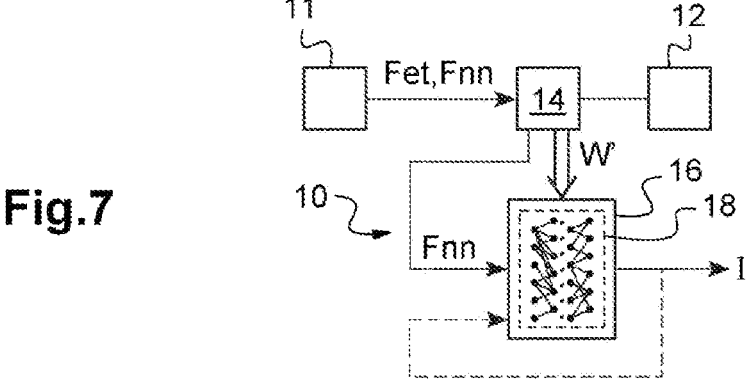
FIG. 7 shows an electronic encoding device according to an embodiment of the invention.

FIG. 7 shows an electronic decoding device 10 using at least one artificial neural network 18.

This electronic decoding device 10 comprises a reception unit 11, a processor 14 (for example, a microprocessor) and a parallelized processing unit 16, for example a Graphical Processing Unit or GPU, or a Tensor Processing Unit or TPU.

Reception unit 11 is for example a communication circuit (such as a radiofrequency communication circuit) and makes it possible to receive data (and in particular here the encoded data stream) from an external electronic device, such as electronic encoding device 2, and to communicate these data to processor 14 (to which reception unit 11 is for example connected by a bus).

Electronic decoding device 10 also comprises a storage unit 12, for example a memory (possibly a rewritable non-volatile memory) or a hard-drive. Although storage unit 12 is shown in FIG. 7 as an element distinct from processor 14, storage unit 12 could as an alternative be integrated to (i.e. included in) processor 14.

Processor 14 is in this case adapted to execute successively a plurality of instructions of a computer program stored for example in storage unit 12.

Parallelized processing unit 16 is designed to implement artificial neural network 18 after having been configured by processor 14. For that purpose, parallelized processing unit 16 is designed to perform in parallel, at a given time, a plurality of operations of the same type.

As schematically shown in FIG. 7, processor 14 receives a data stream (for example, via communication means, not shown, of electronic decoding device 10) comprising a first set of data, here the header Fet, and a second set of data representative of the audio or video content, here the compressed stream Fnn.

As explained hereinafter, the artificial neural network 18 is used within the framework of a processing of the second set of data (that is to say here compressed data Fnn) to obtain an audio or video content corresponding to initial audio or video content B.

Storage unit 12 can store a plurality of parameter sets, each parameter set defining a decoding artificial neural network. As explained hereinafter, processor 14 can in this case configure parallelized processing unit 16 by means of a particular set of parameters among these parameter sets in such a way that parallelized processing unit 16 can then implement the artificial neural network defined by this particular set of parameters.

Storage unit 12 may in particular store a first set of parameters defining a first artificial neural network forming a random access decoder and/or a second set of parameters defining a second artificial neural network forming a low latency decoder.

In this case, electronic decoding device 10 has decoding options in advance for both situations where random access to the content is desired and situations where the content is to be displayed without delay.

Now will be described with reference to FIG. 8 a decoding method that is implemented within electronic decoding device 10 and using artificial neural network 18 implemented by parallelized processing unit 16.

This method may begin by an optional step of transmission, by the electronic decoding device 10 and towards a device for controlling the transmission of data stream to be decoded, of a list L of artificial neural networks available by electronic decoding device 10. The data stream transmission control device can for example be electronic encoding device 2. (Electronic encoding device 2 receives in this case this list L at step E2 described hereinabove with reference to FIG. 2.) As an alternative, the data stream transmission control device could be a dedicated server, operating in cooperation with electronic encoding device 2.

The artificial neural networks accessible by electronic decoding device 10 are the artificial neural networks for which electronic decoding device 10 stores a set of parameters defining the concerned artificial neural network (as indicated hereinabove) or may have access to this set of parameters by connection to remote electronic equipment such as a server (as explained hereinafter).

Figure 8:
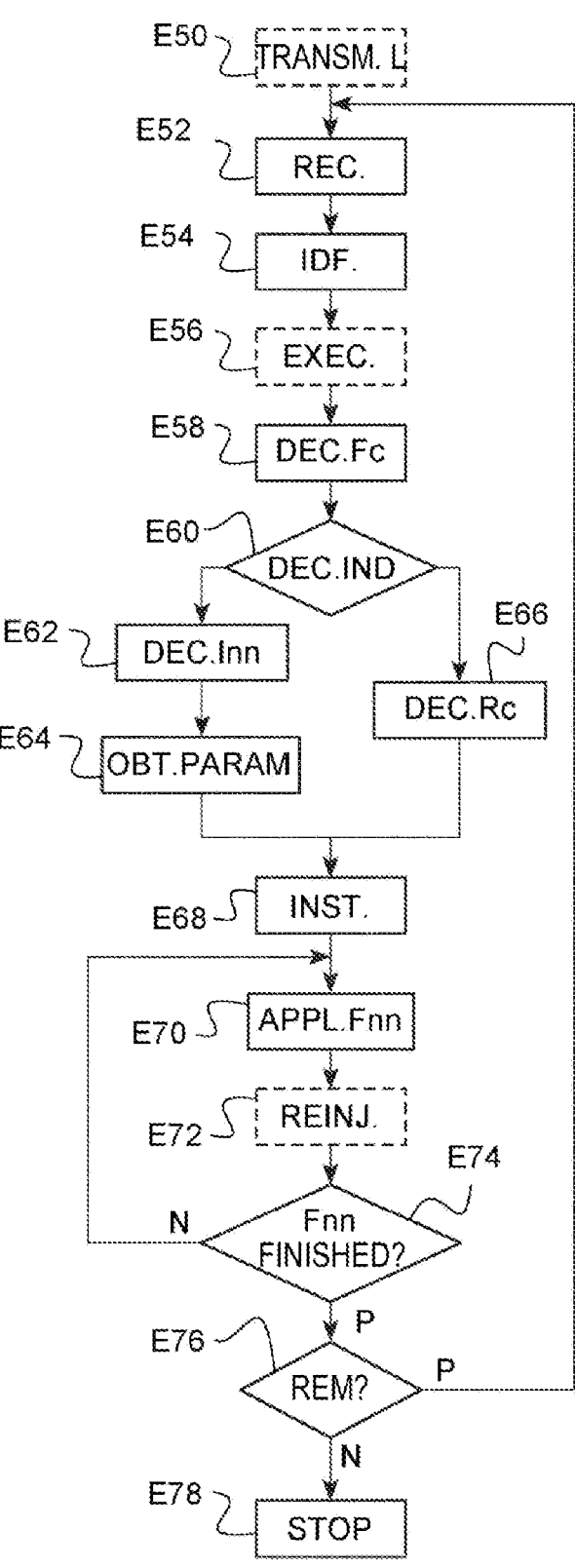
FIG. 8 is a flowchart showing steps of a decoding method implemented within the electronic decoding device of FIG. 7.

The method of FIG. 8 comprises a step E52 of receiving (by electronic decoding device 10, and precisely here by reception unit 11) the data stream comprising the first set of parameters, i.e. header Fet; and the second set of parameters, i.e. compressed stream Fnn. Reception unit 11 transmits the received data stream to processor 14.

Processor 14 then proceeds to a step E54 of identifying the first set of data (header Fet) and the second set of data (compressed stream Fnn) within the received data stream, for example by means of the indicator of compressed stream beginning (already mentioned in the description of step E24).

Processor 14 may also identify at step E54 the different parts of the first set of data (header), that is to say, here, within header Fet: the first part Fc (comprising data representative of characteristics of the format of the content encoded by the data stream), the second part (indicator IND or IND'), the third part (identifier Inn or encoding data Rc) and possibly the fourth part (computer program Exe), as illustrated in FIGS. 3 to 6 described hereinabove.

In the cases where executable instructions (such as the instructions of the computer program Exe) are identified (i.e. detected) within the first data at step E54, processor 14 may launch, at step E56, the execution of these executable instructions in order to implement certain at least of the steps (described hereinafter) of processing of the data from the first set of data. These instructions may be executed by processor 14 or, as an alternative, by a virtual machine instantiated within electronic decoding device 10.

The method of FIG. 7 continues with a step E58 of decoding data Fc that are characteristic of the format of representation of the audio or video content in such a way as to obtain characteristics of this format. In the case of a video content, for example, the decoding of data part Fc makes it possible to obtain the image sizes (in pixels) and/or the frame rate and/or the binary depth of the luminance information and/or the binary depth of the chrominance pieces of information.

Processor 14 then proceeds (in certain embodiments, due to the execution of instructions identified within the first set of data at step E54, as already indicated) to a step E60 of decoding indicator IND, IND' here contained in the second part of header Fet.

If the decoding of indicator IND, IND' present in the received data stream indicates that artificial neural network 18 to be used for the decoding belongs to a predetermined set of artificial neural networks (that is to say, if the indicator present in the first set of data is indicator IND indicating that decoding artificial neural network 18 belongs to a predetermined set of artificial neural network), the method continues with step E62 described hereinafter.

If the decoding of indicator IND, IND' present in the received data stream indicates that artificial neural network 18 to be used for the decoding is encoded in the data stream (that is to say, if the indicator present in the first set of data is indicator IND' indicating that decoding artificial neural network 18 is encoded in the data stream), the method continues with step E66 described hereinafter.

At step E62, processor 14 proceeds (in certain embodiments, due to the execution of instructions identified within the first set of data at step E54, as already indicated) to the decoding of identifier Inn (here contained in the third part of header Fet). As already indicated, this identifier Inn is an identifier designating decoding artificial neural network 18, for example within the above-mentioned predetermined set of artificial neural networks.

Processor 14 can then proceed (in certain embodiments, due to the execution of instructions identified within the first set of data at step E54, as already indicated), at step E64, to the reading, for example in storage unit 12, of a set of parameters associated with the decoded identifier Inn (this set of parameters defining the artificial neural network identified by the decoded identifier Inn).

According to a possible embodiment, it may be provided that processor 14 generates an error message in case of absence (here within storage unit 12) of data (in particular parameters) related to this artificial neural network identified by the decoded identifier Inn.

As an alternative (or in the case where no set of parameters is stored in storage unit 12 for the artificial neural network identified by the decoded identifier Inn), the electronic decoding device 10 may transmit (in certain embodiments, due to the execution of instructions identified within the first set of data at step E54, as already indicated) a request for a set of parameters to a remote server (this request including for example the decoded identifier Inn) and receive as an answer at step E64 the set of parameters defining the artificial neural network identified by the decoded identifier Inn.

The method then continues with step E68 described hereinafter.

At step E66, processor 14 proceeds (in certain embodiments, due to the execution of instructions identified within the first set of data at step E54, as already indicated) to the decoding of the data Rc descriptive of artificial neural network 18 (here contained in the third part of header Fet).

As already indicated, these descriptive data (or encoding data) Rc are for example encoded in accordance with a standard such as MPEG-7 part 17 or with a format such as JSON.

The decoding of descriptive data Rc makes it possible to obtain the parameters defining the artificial neural network to be used for decoding the data from the second set of data (that is to say here data from compressed stream Fnn).

The method continues in this case also with step E68 that will now be described.

Processor 14 then proceeds (in certain embodiments, due to the execution of instructions identified within the first set of data at step E54, as already indicated), at step E68, to the configuration of parallelized processing unit 16 by means of parameters defining decoding artificial neural network 18 (parameters obtained at step E64 or at step E66), in such a way that parallelized processing unit 16 can implement decoding artificial neural network 18.

This configuration step E68 comprises in particular the instantiation of decoding artificial neural network 18 within parallelized processing unit 16, here using the parameters obtained at step E64 or at step E66.

This instantiation may comprise in particular the following steps:
- reserving, within parallelized processing unit 16, the memory space required for implementing decoding artificial neural network 18; and/or
- programming parallelized processing unit 16 with the parameters (including for example weights W' and activation functions) defining decoding artificial neural network 18 (parameters obtained at step E64 or at step E66); and/or
- loading part at least of the data from the second set of data (that is to say part at least of the data from compressed stream Fnn) in a local memory of parallelized processing unit 16.

As can be seen from the above description of steps E58 to E68, the data from the first set of data Fet are thus processed by processor 14.

Processor 14 can then apply (i.e. present) at step E70 the data from the second set of data (here data from compressed stream Fnn) to artificial neural network 18 implemented by parallelized processing unit 16 in such a way that these data are processed by a decoding process using at least in part artificial neural network 18.

In the example described here, the artificial neural network 18 receives as an input the data from the second set of data Fnn and produces as an output a representation I of the encoded content, adapted for a reproduction on an audio or video reproduction device. In other words, certain at least of the data from the second set of data Fnn are applied to the input layer of artificial neural network 18 and the output layer of artificial neural network 18 produces the above-mentioned representation I of the encoded content. In the case of a video content (comprising an image or a sequence of images), artificial neural network 18 thus produces as an output (that is to say at the output layer thereof) at least one matrix representation I of an image.

In certain embodiments, for processing certain data from compressed stream Fc (corresponding for example to a block or an image), artificial neural network 18 can receive as an input certain at least of the data produced at the output of artificial neural network 18 during the processing of previous data (corresponding for example to the preceding block or to the preceding image) in compressed stream Fc. In this case, it is proceeded to a step E72 of reinjecting data produced at the output of artificial neural network 18 to the input of artificial neural network 18.

Moreover, according to other possible embodiments, the decoding process could use a plurality of artificial neural networks, as already mentioned hereinabove about the processing of content data B.

The data from the second set (here certain data at least of compressed stream Fnn) have thus been processed by a process depending on part of the data from the first set (process here depending on the identifier Inn or an encoding data Rc) and using artificial neural network 18 implemented by parallelized processing unit 16.

Processor 14 then determines at step E74 if the processing of compressed stream Fnn by means of artificial neural network 18 is finished.

In case of negative determination (N), the method loops to step E70 for application to other data from compressed stream Fnn to artificial neural network 18.

In case of positive determination (P), the method continues to step E76 where processor 14 determines if it remains data to be processed in the received data stream.

In case of negative determination (N) at step E76, the method is ended at step E78.

In case of positive determination (P) at step E76, the method loops to step E52 for processing a new part of the data stream as shown in one of FIGS. 3 to 6.

As indicated hereinabove as regards the reiteration of the encoding steps E4 to E24, this other part of the data stream then also comprises a first set of data and a second set of data representative of another audio or video content (for example, in the case of a video content, another group of images for the format of representation of the content used). Another artificial neural network can in this case be determined on the basis of certain of these first data (identifier Inn or encoding data Rc), as described hereinabove at steps E54 to E66, then parallelized processing unit 16 may be configured to implement this other artificial neural network (in accordance with the above-described step E68). The data from the second set of data of this other part of the data stream (related for example to the above-mentioned other group of images) may then be decoded by means of this other artificial neural network (as described hereinabove at step E70).

The just-mentioned other artificial neural network may have an identical structure to that of the above-mentioned artificial neural network 18, which simplifies the step of configuring parallelized processing unit 16 (only the weights and/or the activation functions defining the current artificial neural network being for example updated).

The invention claimed is:
1. A method for decoding a data stream by an electronic device including a first processor and a parallelized processor configured to perform in parallel, at a specific time, a plurality of a same type operations, the data stream including a first set of data and a second set of data representative of an audio or video content, the method comprising:

obtaining an identifier or data descriptive of an artificial neural network by processing data from the first set of data by the first processor; and obtaining the audio or video content by processing data from the second set of data using said artificial neural network implemented by the parallelized processor.

2. The decoding method according to claim 1, further comprising configuring the parallelized processor as a function of at least part of the data from the first set of data.

3. The decoding method according to claim 2, wherein the first set of data comprises the data descriptive of the artificial neural network, and wherein, in the configuring, the first processor configures the parallelized processor based on said descriptive data.

4. The decoding method according to claim 2, wherein:
the electronic device comprises a storage configured to store a plurality of parameter sets respectively defining a plurality of artificial neural networks;
wherein the first set of data comprises the identifier; and
wherein, in the configuring, the first processor configures the processor based on a set of parameters associated with the identifier among the plurality of parameter sets.

5. The decoding method according to claim 2, wherein:
the data stream further comprises instructions executable within the electronic device; and
wherein the configuring the parallelized processor is performed due to execution of at least part of said instructions.

6. The decoding method according to claim 2, wherein:
the data stream further comprises instructions executable within the electronic device; and
wherein the processing of the first data set is at least partially performed due to execution of at least part of said instructions.

7. The decoding method according to claim 6, wherein the configuring of the parallelized processor is performed due to execution of at least part of said instructions.

8. The decoding method according to claim 2, further comprising identifying the first set of data and the second set of data within the data stream.

9. The decoding method according to claim 2, wherein the first set of data comprises data representative of characteristics of a format of the audio or video content encoded by the data stream.

10. The decoding method according claim 1, wherein:
the data stream further comprises instructions executable within the electronic device; and wherein the processing of the data from the first data set is at least partially performed due to execution of at least part of said instructions.

11. The decoding method according to claim 1, wherein the first set of data comprises data representative of characteristics of a format of the audio or video content encoded by the data stream.

12. The decoding method according to claim 1, wherein the processing of the data from the second set produces at least one matrix representation of at least a part of an image.

13. The decoding method according to claim 1, wherein the artificial neural network receives, as an input, data from the second set of data.

14. The decoding method according to claim 1, wherein the artificial neural network receives, as an input, data previously produced as an output of the artificial neural network.

15. The decoding method according to claim 1, wherein the first set of data and the second set of data are identifiable individually within the data stream.

16. An electronic device configured to decode a data stream including a first set of data and a second set of data representative of an audio or video content, the electronic device comprising:
a first processor configured to process data from the first set of data to obtain an identifier or data descriptive of an artificial neural network; and
a parallelized processor configured to perform in parallel, at a specific time, a plurality of same type operations and configured to obtain the audio or video content by processing data from the second set of data using the artificial neural network implemented by the parallelized processor.

17. The electronic device according to claim 16, wherein the first processor configures the parallelized processor as a function of at least part of the data from the first set of data.

18. The electronic device according to claim 17, further comprising a storage configured to store a plurality of parameter sets respectively defining a plurality of artificial neural networks, wherein:
the first set of data comprises the identifier; and
wherein the first processor configures the parallelized processor based on a set of parameters associated with the identifier among the plurality of parameter sets.

19. The electronic device according to claim 16, wherein the parallelized processor is configured to produce at least one matrix representation of at least a part of an image.

* * * * *